April 25, 1944.  L. G. LINDSAY  2,347,203
MULTIPLE PORT VALVE
Filed April 18, 1942
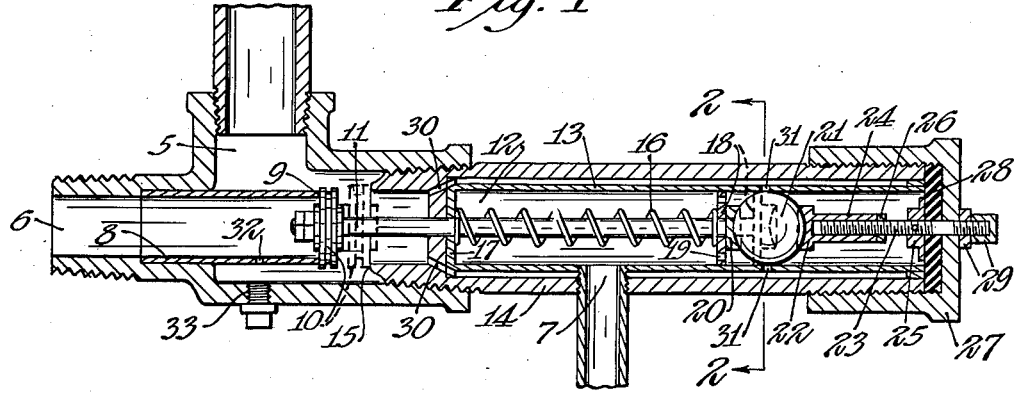
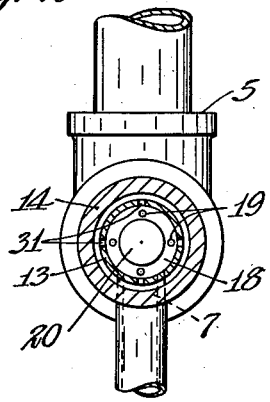
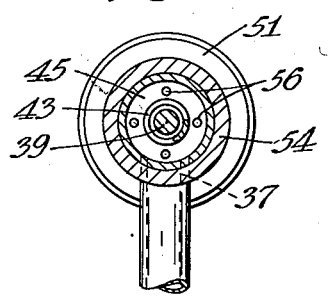
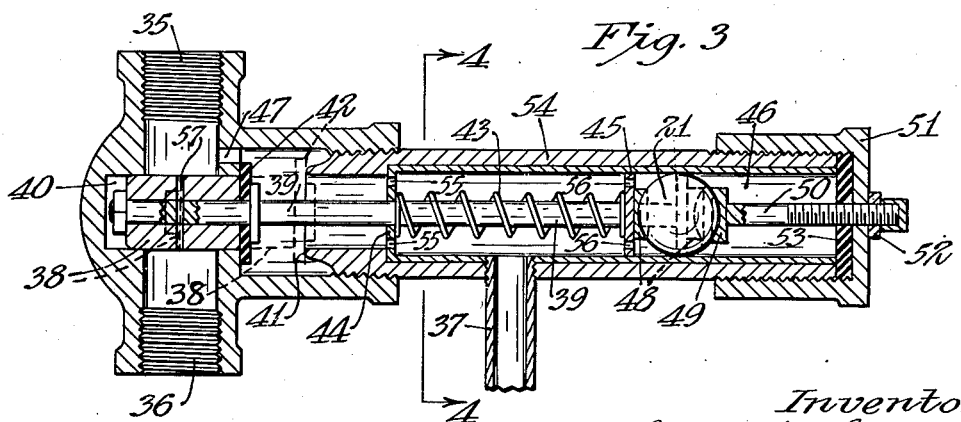
Inventor
Lynn G. Lindsay
By John E. Stryker Jr.
Attorney Patented Apr. 25, 1944

2,347,203

UNITED STATES PATENT OFFICE 2,347,203

MULTIPLE PORT VALVE

Lynn G. Lindsay, Chicago, Ill.

Application April 18, 1942, Serial No. 439,483

11 Claims. (Cl. 137—144)

This invention relates to a valve wherein a solid body adapted to dissolve in the fluid in the valve is used to retain a valve member in a predetermined position for the period of time required to reduce the soluble body to the point where it collapses and allows the valve member to move to another position. The present invention is an improvement on that described and claimed in my application Serial No. 429,156, filed February 2, 1942.

It is an object of the present invention to insure, in a valve of this class, quick operation of the valve member and sudden collapse of the soluble body when the latter has been subjected to the solvent for a predetermined period of time.

A further object is to protect the soluble body against unintentional breakage in the valve chamber due to carelessness or ignorance on the part of the operator.

Other objects will appear and be more fully pointed out in the following specification and claims:

Referring to the accompanying drawing:

Figure 1 is a central longitudinal section through one embodiment of my improved valve;

Fig. 2 is a cross section taken on the line 2—2 of Fig. 1 with the ball 21 removed;

Fig. 3 is a central, longitudinal section through another form of the valve, and Fig. 4 is a section taken on the line 4—4 of Fig. 3.

As shown in Fig. 1, the valve casing has two main ports 5 and 6 and an auxiliary port 7. Fixed in axial continuation of the port 6 is a tube 8 having a valve seat 9 formed on its end surface. The valve closure member comprises a head 10 mounted on a stem 11 which is movable longitudinally to and from the seat 9 and projects into a chamber 12 formed in a tubular lining 13 for a cylindrical casing member 14. An end of the latter is formed with a seat 15 for engagement with the head 10. A helical spring 16 is mounted coaxially on the valve rod 11 and is arranged to urge the valve head toward the seat 15, the spring being confined at its ends between an end 17 of the chamber 12 and a disk 18 fixed on the rod 11. The disk 18 is formed with openings 19 for the passage of liquid and fixed on its outer face is a contact member 20 having a concavely spherical face adapted to fit the periphery of a soluble body 21 of spherical shape. A second contact member 22 is mounted on an end of a rod 23 disposed in axial alignment with the rod 11. The contact face of the member 22 is concavely spherical and adapted to fit the member 21 diametrically opposite to the member 20. Integral with the member 22 is an internally threaded sleeve 24 fitting external threads on the rod 23 to provide for adjustment of the spacing of the member 22 relative to a collar 25 which is mounted on the rod 23. A lock nut 26 engages the outer end of the sleeve 24 and the collar 25 may be fixed on the rod 23 by means of a cross pin or shoulder so that end thrust may be transmitted to and from the rod through the collar.

Threaded on the outer end of the casing member 14 is a cap 27 which is perforated axially to receive the rod 23 and provided with a thick, soft rubber washer 28 for engagement with the collar 25 and outer end of the casing member 14. Lock nuts 29 may be threaded on the outer end of the rod 23 to fasten it to the cap 27 and allow limited longitudinal movement of the rod relative to the cap. The tubular liner 13 is spaced slightly from the inner surface of the casing member 14 and the intervening space communicates with small passages 30 at one end and with openings 31 formed in the liner at diametrically opposite sides of the body 21 when the latter is in place in the valve. In order to balance the pressure on opposite faces of the valve head 10 when it is closed against the seat 9, I provide a minute opening 32 in the tube 8. This opening is accessible for cleaning through an opening in the valve casing which is normally closed by a plug 33.

In operation, assuming that the soluble body 21 has been placed in operative relation to the valve stem, as shown in full lines in Fig. 1, the spring 16 holds the body 21 under compression and the valve head 10 is closed against the seat 9 so that the port 5 is in communication with the port 7. Water or other fluid under pressure now enters through the port 5 and passes through the openings 30 and space between the liner 13 and member 14, thence through the openings 31 against the periphery of the member 21 and the solution escapes past the disk 18 to the port 7. The surface areas of the body 21 covered by the contact members 20 and 22 are not materially affected by the stream of water directed from the openings 31 and the soluble body 21 is reduced at the highest rate approximately in a plane extending perpendicularly to the axis of the valve stem 11. When the dissolution of the body 21 has reached the point where the remaining portions have insufficient strength to resist the thrust of the spring 16, such portions collapse suddenly and the valve head 10 is moved by the spring to close against the seat 15 instantaneously. This reestablishes communication between the ports 5 and 6 and closes communication between the ports 5 and 7.

When the valve is to be reset for another automatic operation, the cap 27 is removed and another candy ball or soluble body is inserted in the casing against the contact member 20. Now the screw cap 27 is replaced so that the body 21 is actuated to the left against the action of the spring 16 until the valve head 10 has closed against the seat 9. During this closing movement the thrust of the cap 27 is transmitted through the soft rubber washer 28, collar 25, rod 23 and member 22 to the body 21 and when the head 10 is finally stopped by the seat 9 the washer 28 closes against the outer end of the casing member 14 and cushions the thrust against the ball 21 so that breakage is effectively prevented. By a simple adjustment of the lock nut and sleeve 24 on the rod 23 the simultaneous closing of the head 10 against seat 9 and cap 27 against the end of the casing may be obtained.

In the alternate form of my device shown in Fig. 3 the valve casing has the main ports 35 and 36 and an auxiliary port 37. A cylindrical valve head 38 is mounted on a stem 39 to move across the passage connecting the ports 35 and 36 to open and close communication between these ports. The head 38 is formed to slidably fit in a cylindrical guide bore 40 in which it is movable from the full line to the dotted line position shown in Fig. 3. I also provide an annular seat 41 for engagement with a washer 42 mounted on an end of the head 38 so that this washer closes against the seat 41 when the head 38 is moved to its fully open or dotted line position relative to the guide bore 40. Mounted on the stem 39 is a spring 43 arranged to normally hold the washer 42 against the seat 41. This spring is confined at one end by a disk 44 fixed in the valve casing and at its other end by a disk 45 fixed on the valve rod 39.

A soluble body 21 may be placed in a chamber 46. Communication between the port 35 and chamber 46 is established through a passage 47 formed in the valve casing. When in place in the chamber the body 21 is confined at diametrically opposite peripheries by contact members 48 and 49, each having a concavely spherical face fitting the surface of that body. The member 48 is fixed on the outer face of the disk 45 and the member 49 is fixed on the inner end of a rod 50 mounted centrally on a threaded, removable cap 51 for the chamber 46. The rod 50 has a threaded connection with the cap to permit the adjustment of the spacing of the member 49 relative to the cap, a lock nut 52 being provided to prevent unintentional turning of the rod relative to the cap. A suitable washer 53 may be provided for engagement with the outer end of the valve casing member 54.

A series of openings 55 are formed in the disk 44 to allow the passage of fluid to the port 37 and also to openings 56 formed in the disk 45. From the openings 56 the fluid is directed against the outer periphery of the body 21 between the areas covered by the contact members 48 and 49. To balance pressure on opposite sides of the head 38 when it is in its closed, full line position shown in Fig. 3, a small passage 57 is formed in this head to extend transversely and connect port 35 with port 36.

In operation, assuming that the members of the valve are in the position shown in full lines in Fig. 3, water or other fluid under pressure passes from the port 35 through the passage 47 and openings 55 to the port 37 and also is directed by the openings 56 against the periphery of the soluble body 21 adjacent to the wall of the chamber 54. The body gradually dissolves until it is weakened to the point where it collapses under the pressure of the spring 43, whereupon the latter actuates the head 39 to open position in the guide bore 40 and simultaneously closes the washer 42 against the seat 41. This closes communication between the ports 35 and 37 and establishes communication between the ports 35 and 36. It will be evident that the cylindrical valve head 38 is of the type which may be moved beyond its closed position in the closing direction so that there is no increased thrust on the body 21 when the cap 51 is stopped by the end of the casing 46.

The soluble body 21 may be made of hard candy or other material that will pass into solution at the rate desired and its shape and size may be varied to obtain automatic operation of the valve after the elapse of the required period of time. In the event of the use of a body having the shape of a cube or in any case where its opposite faces are flat, it will be understood that the members 20 and 22 (Fig. 1) or 48 and 49 (Fig. 3) will have flat contact faces adapted to conform to opposite sides of the soluble member.

An important field of usefulness for my invention is in the semi-automatic control of water softeners of the type which require periodic regeneration. For such use the port 5 (Fig. 1) or port 35 (Fig. 3) may be connected to the soft water outlet of the softener tank, the port 6 (Fig. 1) or port 36 of Fig. 3 may be connected to the service pipe and the ports 7 or 37 may be connected to the waste pipe or drain. When the body of water softening material requires regeneration, a charge of salt or other regeneration material is placed in the tank provided therefor and then one of the soluble bodies 21 is merely inserted in the valve casing and placed under compression by operation of the valve cap. Thereafter, the softener will be regenerated and automatically returned to normal operation by dissolution of the body 21. Other uses for my invention will be obvious to those skilled in the art to which it pertains.

Having described my invention, what I claim as new and desire to protect by Letters Patent is:

1. In a timing valve, a casing formed to receive a self sustaining, soluble body, contact members in said casing formed to fit and cover substantial areas of opposite faces of said body respectively, a movable closure head operatively connected to one of said contact members, a seat for said head, means for actuating the other of said members to close said head against said seat and to grip such soluble body in the casing between said members, resilient means for holding said body under compression between said members and an internal passage formed in said casing for directing a fluid solvent for said body against exposed portions thereof.

2. The valve according to claim 1 in which said soluble body is substantially spherical and the contact members have concavely spherical faces adapted to fit the curvature of the soluble body.

3. A timing valve having in combination, a casing formed to receive a self sustaining, soluble body and a fluid solvent for said body, contact members formed to fit and cover substantial areas of opposite faces of said body respectively, a movable closure head operatively connected to one of said contact members, a seat for said head, means for actuating the other of said members to close said head against said seat and to grip such soluble body in the casing between said members, a spring arranged to urge said head toward a predetermined open position and to hold said body under compression between said members and a passage for directing said fluid solvent in said casing against exposed portions of said body.

4. A timing valve having in combination, a casing formed to receive a self sustaining, soluble body and a fluid solvent for said body, contact members in said casing formed to fit and cover substantial areas of opposite faces respectively of said body, a movable closure head operatively connected to one of said contact members, a seat for said head, manually operable means for actuating the other of said contact members to close said head against said seat and to grip said body in the casing between said members, resilient means for holding said body under compression between said members and a passage for directing said fluid solvent in said casing against exposed portions of said body.

5. In a timing valve, a casing formed to receive a self sustaining, soluble body, contact members in said casing formed to fit and cover substantial areas of opposite faces respectively of said body, a movable closure head operatively connected to one of said contact members, a seat for said head, manually operable means for actuating said head, body and contact members together in one direction to close said head against said seat and to grip said soluble body in the casing between said members, resilient means for urging said head in the opposite direction to open position while holding said body under compression between said members and an internal passage formed in said casing for directing a fluid solvent against exposed portions of said body when said head is in closed position against the seat.

6. In a valve of the class described, a chamber adapted to receive a soluble body, contact members disposed in said chamber to engage opposite faces of such body therein, a valve head, a seat for said head, means operatively connecting said head to one of said contact members, manually operable means for actuating the valve head to closed position against its seat and for placing said soluble body under compression and resilient means for transmitting the force of compression to said soluble body.

7. In a valve of the class described, a chamber adapted to receive a soluble body, contact members disposed in said chamber to engage opposite faces of such body therein, a valve head, a seat for said head, means operatively connecting said head to one of said contact members, a spring disposed to urge said head to open position relative to its seat and to retain said body under compression between said members, manually operable means for actuating the valve head to closed position against its seat and for placing said soluble body under compression and resilient means for transmitting to said soluble body the force of compression exerted by said manually operable means thereon.

8. In a valve of the class described, a cylindrical chamber adapted to receive a soluble body, a screw cap closure for an end of said chamber, said cap being removable to permit the insertion of said body, contact members disposed in said chamber to engage opposite faces of such body in the chamber, means operatively connecting one of said members to said cap, a valve head, a seat for said head, means operatively connecting said head to the other of said contact members, said cap being manually operable to actuate the valve head to closed position against its seat and to place said soluble body under compression and resilient means interposed between said cap and body for transmitting the compression force to said body.

9. In a valve of the class described, a chamber formed to receive a soluble body, contact members in said chamber formed to fit and cover substantial areas of opposite faces respectively of said body, a valve head operatively connected to one of said contact members, manually operable means for actuating the other of said contact members toward said body, resilient means for holding said body under compression between said members and a series of passages formed in the wall of the chamber to direct a fluid solvent for said body against exposed portions thereof, said passages having outlet openings disposed to direct the fluid in radially converging streams in a plane which is substantially perpendicular to the direction of the force of compression on said body.

10. In a valve of the class described, a tubular chamber formed to receive a soluble body, said chamber having spaced inner and outer walls, means for supplying a fluid solvent for said body to the space between said walls, contact members in said chamber adapted to engage opposite faces respectively of said body, resilient means for holding said body under compression between said members, a series of passages formed in the inner wall of the chamber to direct the fluid solvent in radially converging streams upon said body and in a plane which is substantially perpendicular to the direction of the force of compression on said body and an outlet port for said fluid communicating with said chamber.

11. In a valve of the class described, a casing formed to receive a soluble body, a valve seat in said casing, a valve head adapted to be held in closed position against said seat by said body, resilient means for actuating said head to open position upon the disintegration of said body, a minute passage formed and arranged within the casing to equalize fluid pressure upon opposite faces of said valve head when in closed position, the valve casing being formed with an exterior opening to allow access to said passage for cleaning, and a removable closure for said opening.

LYNN G. LINDSAY.